(12) United States Patent
Tarabzouni

(10) Patent No.: US 11,946,567 B1
(45) Date of Patent: Apr. 2, 2024

(54) GATE VALVE ASSEMBLY

(71) Applicant: Saudi Arabian Oil Company, Dhahran (SA)

(72) Inventor: Mohanned Tarabzouni, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/986,986

(22) Filed: Nov. 15, 2022

(51) Int. Cl.
*F16K 39/04* (2006.01)
*F16K 3/30* (2006.01)

(52) U.S. Cl.
CPC .............. *F16K 39/04* (2013.01); *F16K 3/30* (2013.01); *F16K 2200/402* (2021.08)

(58) Field of Classification Search
CPC ................................. F16K 39/04; F16K 3/30
See application file for complete search history.

(56) References Cited

U.S. PATENT DOCUMENTS

| 2,948,503 | A |   | 8/1960  | Williams    |            |
|-----------|---|---|---------|-------------|------------|
| 4,230,299 | A | * | 10/1980 | Pierce, Jr. | F16K 43/008 |
|           |   |   |         |             | 251/282    |
| 4,281,819 | A | * | 8/1981  | Linder      | F16K 39/04 |
|           |   |   |         |             | 251/282    |
| 4,423,748 | A | * | 1/1984  | Ellett      | F16K 31/56 |
|           |   |   |         |             | 92/130 C   |
| 4,451,047 | A | * | 5/1984  | Herd        | F16K 15/02 |
|           |   |   |         |             | 277/540    |
| 5,050,842 | A | * | 9/1991  | Foster      | F16K 3/0227 |
|           |   |   |         |             | 251/193    |
| 5,979,483 | A | * | 11/1999 | Zapalac     | F16K 41/02 |
|           |   |   |         |             | 277/516    |
| 6,698,444 | B1 | * | 3/2004 | Enston      | F16K 29/00 |
|           |   |   |         |             | 137/246.22 |
| 11,583,984 | B2 | * | 2/2023 | Alshiha    | F16K 43/003 |

FOREIGN PATENT DOCUMENTS

KR   20110065663   6/2011
KR     101425301   8/2014

OTHER PUBLICATIONS hardhatengineer.com [online], "Types of Gate Valve and Parts—A Complete Guide for Engineer," HardHat Engineer, available on or before Mar. 21, 2019 via WayBack Machine URL <http://web.archive.org/web/20190321145536/https://hardhatengineer.com/gate-valve-types-parts/>, retrieved on Nov. 4, 2022, retrieved from URL <https://hardhatengineer.com/gate-valve-types-parts/>, 32 pages.
sciencedirect.com [online], "Gate Valve," Twort's Water Supply (Seventh Edition), 2017, abstract, retrieved from URL <https://www.sciencedirect.com/topics/engineering/gate-valve>, retrieved on Nov. 4, 2022, 18 pages.

* cited by examiner

*Primary Examiner* — Kevin R Barss
(74) *Attorney, Agent, or Firm* — Fish & Richardson P.C.

(57) ABSTRACT

A valve assembly that includes a gate valve and an injection fitting. The gate valve has a lower body disposed between and fluidly coupled to a first pipe and a second pipe. The first pipe resides upstream of the lower body and the second pipe resides downstream of the lower body. The injection fitting is coupled to a side of the lower body of the gate valve. The injection fitting receives a sealing fluid to be flowed to the lower body of the gate valve to seal at least a portion of the gate valve.

15 Claims, 3 Drawing Sheets

GATE VALVE ASSEMBLY

FIELD OF THE DISCLOSURE

This disclosure relates to fluid control devices, and more particularly to gate valves.

BACKGROUND OF THE DISCLOSURE

Valves are used in piping systems to regulate the flow of fluids in pipes and other fluid conduits. Some valves are used to form a seal between an inlet of the valve and an outlet of the valve. Forming a seal prevents fluids from leaking across the valve, allowing the valve to interrupt the fluid flow within a pipe.

SUMMARY

Implementations of the present disclosure include a valve assembly that includes a gate valve and an injection fitting. The gate valve has a lower body disposed between and fluidly coupled to a first pipe and a second pipe. The first pipe resides upstream of the lower body and the second pipe resides downstream of the lower body. The injection fitting is coupled to a side of the lower body of the gate valve. The injection fitting receives a sealing fluid to be flowed to the lower body of the gate valve to seal at least a portion of the gate valve.

In some implantations, the valve assembly also includes a first valve fluidly coupled to the lower body of the gate valve and a second valve disposed between and fluidly coupled to the first valve and the gate valve. The injection fitting receives the sealing fluid to be flowed, with the second valve opened, to the gate valve.

In some implantations, the first valve is cold tapped or threaded into the side of the lower body of the gate valve, between the two sealing surfaces of the wedge gate of the gate valve.

In some implantations, the valve assembly also includes a third pipe disposed between and fluidly coupled to the second valve and the gate valve. The third pipe is cold tapped or threaded into the side of the lower body of the gate valve. In some implantations, the third pipe is a pipe spool including an internal diameter of between 0.5 and 2 inches.

In some implantations, the first valve is attached to a branch pipe of a tee pipe fitting. The second valve is coupled to a first end of a main pipe of the tee pipe fitting. In some implantations, the injection fitting is, with the injection fitting coupled to the side of the gate valve, attached to a second end of the main pipe of the tee pipe fitting. The injection fitting receives a sealant or grease to be flowed, with the second gate valve opened, through the gate valve to seal at least a portion of the gate valve.

In some implantations, the injection fitting, the tee pipe fitting, the first valve, and the second valve allow the sealant or grease to be injected against a pressure of between 100 to 200 pounds per square inch more than a pressure at the gate valve.

In some implantations, the gate valve is a wedge gate valve, the first valve is a first gate valve, and the second valve is a second gate valve. The first gate valve and the second gate valve open to allow draining of the volume of the lower body of the wedge gate between the two sealing surfaces of the wedge valve to form a double block and bleed (DBB) valve.

In some implantations, the first valve is fluidly coupled to a threaded plug that can be removed from the first valve to open the first valve to an ambient environment to allow, with the first valve and the second valve opened, draining of the lower body of the gate valve.

In some implantations, the first valve is a 0.5 to 4 inch gate valve and the second valve is a 0.5 to 4 inch gate valve. In some implantations, the first valve is a first API 602 gate valve and the second valve is a second API 602 gate valve.

Implementations of the present disclosure also include a method that includes obtaining a valve assembly. The valve assembly includes (i) a gate valve that has a lower body with an inlet fluidly coupled to a first pipe and an outlet fluidly coupled to a second pipe, and (ii) a pipe connected to a side of the gate valve. The side pipe has one or more fluid outlets that can be opened to an ambient environment. The method also includes bleeding the gate valve through one of the one or more fluid outlets or injecting a sealing fluid through one of the one or more fluid outlets to seal at least a portion of the gate valve.

In some implantations, the one or more fluid outlets includes a first fluid outlet of a valve fluidly coupled to the side of the side of the gate valve and a second fluid outlet of an injection fitting coupled to a side of the gate valve. The injection fitting receives a sealing fluid to be flowed to the lower body of the gate valve to seal at least a portion of the gate valve.

In some implantations, bleeding the gate valve includes removing a threaded plug from the outlet of the valve to open the valve to the ambient environment.

DETAILED DESCRIPTION OF THE DISCLOSURE

The present disclosure relates to a side piping assembly that can be retrofitted into existing gate valves or installed in new gate valves. The side pipe assembly includes two valves and an injection fitting. One of the valves has an outlet that can be opened to an ambient environment to drain the gate valve. The injection fitting allows a sealant to be injected into the gate valve. The side piping assembly is fitted to a side of the gate valve to make the gate valve a double block and bleed (DBB) valve. Additionally, the side piping assembly allows the gate valve to be repaired using sealants, allowing the gate valve to be inline repairable.

Particular implementations of the subject matter described in this specification can be implemented so as to realize one or more of the following advantages. For example, the valve assembly of the present disclosure allows a gate valve to be drained and inline serviced, which can save time and resources.

Figure 1:
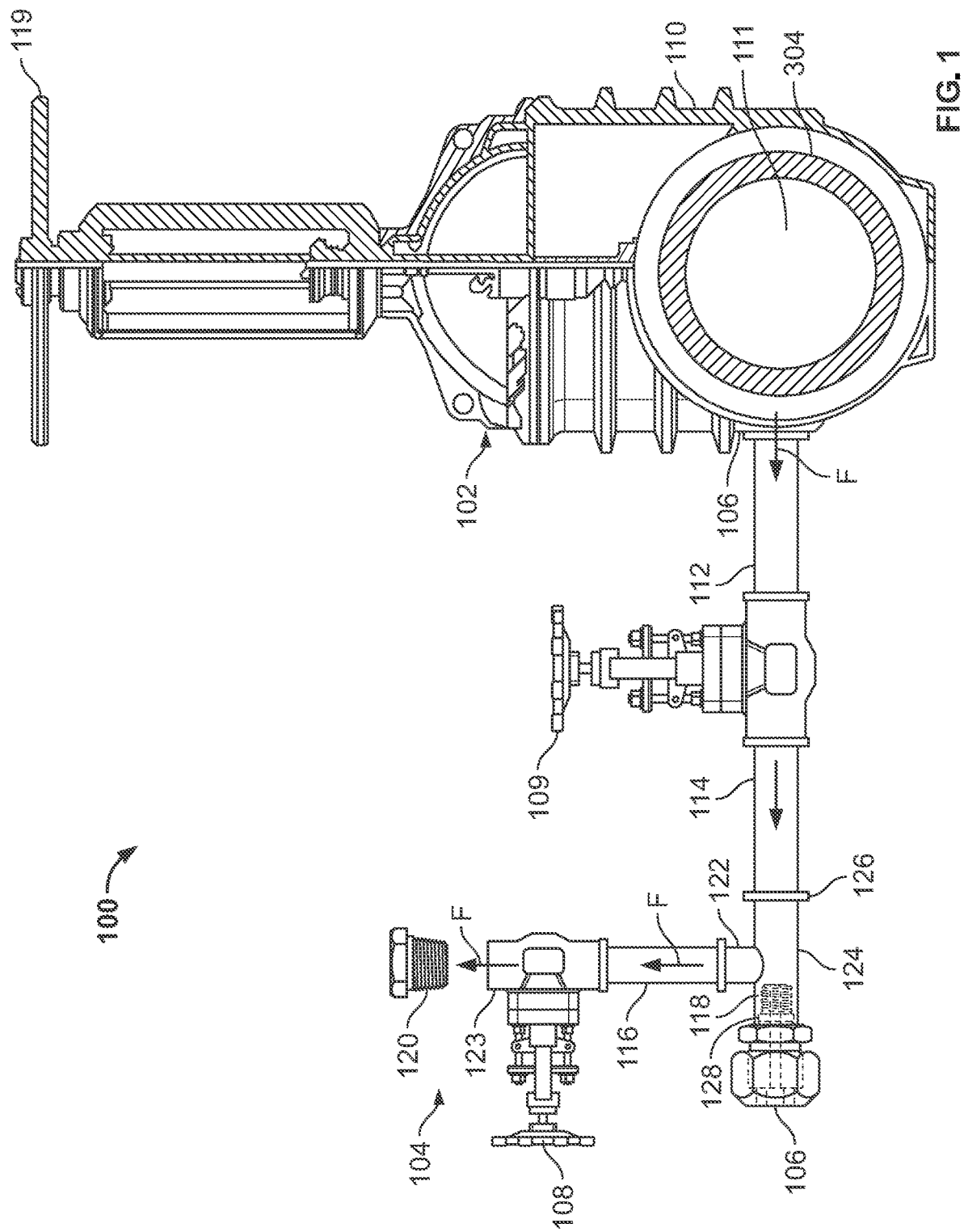
FIG. 1 is a schematic front view of a valve assembly during bleeding of a gate valve of the valve assembly.
Figure 3:
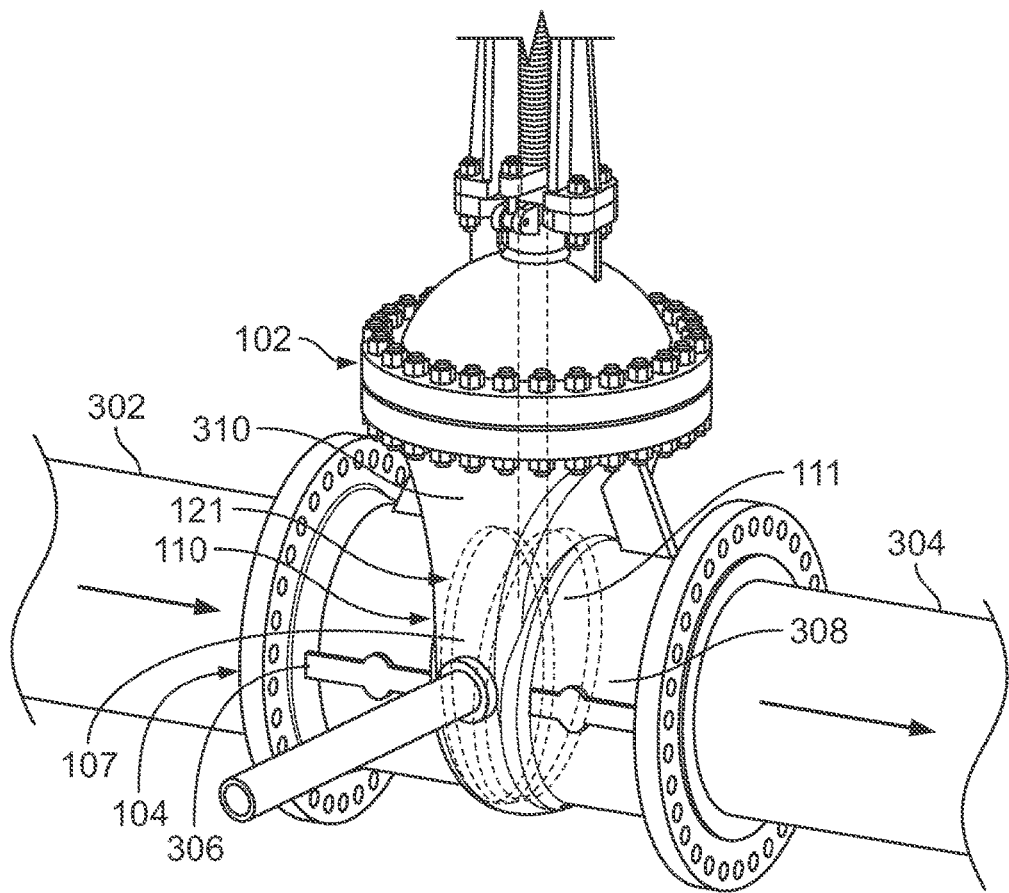
FIG. 3 is a perspective view of a gate valve.

FIG. 1 shows a valve assembly 100 that includes a gate valve 102 (e.g., a wedge gate valve) and a side pipe assembly 104 attached to a side of the gate valve 102. Referring briefly to FIG. 3, the gate valve 102 has a lower body 110 that is disposed between and fluidly coupled to a first pipe 302 and a second pipe 304. The lower body 110 has a first tubular body 306 with a first flange, and a second tubular body 308 with a second flange. The first flange is connected to the first pipe 302 and the second flange is connected to the second pipe 304. The pipes 302, 304 (and the gate valve 102) can direct fluid "F" in both directions. For example, when the fluid "F" flows from left to right, as shown in FIG. 3, the first pipe 302 is upstream of the lower body 110 and the second pipe 304 is downstream of the lower body 110. If the fluid "F" flows in the opposite direction, the first pipe 302 is downstream of the lower body 110 and the second pipe 304 is upstream of the lower body 110. The lower body 110 has a housing 310 that houses the gate 121 (e.g., wedge gate), which has a first sealing surface 107 and a second sealing surface 111. The first sealing surface 107 contacts the first tubular body 306 to form a first seal and the second sealing surface 111 contacts the second tubular body 308 to form a second seal. The side pipe assembly 104 is connected to a side of the housing between or near the two sealing surfaces 107, 111 so that any fluid in the housing 310 can be bled out through the side pipe assembly 104. Thus, the side pipe assembly 104 forms, with the gate valve 102, a double block and bleed (DBB) valve that has only one valve 102 in the main line and thus only one valve actuator 119 (see FIG. 1) or hand wheel (as opposed to other DBB valves that have two valves/actuators and a bleed valve disposed in between the two).

Referring back to FIG. 1, the side pipe assembly 104 includes an injection fitting 106, a first valve 108, and a second valve 109. The side assembly 104 also includes multiple pipes 112, 114, 116 interconnecting the valves and injection fitting, a tee pipe fitting 118, and a plug 120. The third pipe 112 (e.g., first side pipe) can be cold tapped or threaded (or welded) into the side of the lower body 110.

The multiple pipes includes the first side pipe 112, a second side pipe 114, and a third side pipe 116 arranged perpendicular with respect to the first and second side pipes 112, 114. The side pipes 112, 114, 116 can be small pipe spools with an internal diameter of, for example, between 0.5 and 2 inches (e.g., 1 inch). The first valve 108 can be a gate valve and the second valve 109 can also be a gate valve. For example, the first and second gate valves 108, 109 can be to 4 inch gate valves. Additionally, the first and second gate valves 108, 109 can be API 602 gate valves. In some implementations, the valves 108, 109 are different types of valves such as ball valves.

The injection fitting 106 receives a sealant or grease to be flowed toward and into the wedge gate valve 102 to seal at least a portion of the gate valve. The injection fitting 106 resides between the first valve 108 and the second valve 109. The injection fitting 106, the first valve 108, and the second valve 109 are fluidly coupled to the tee pipe fitting 118. The tee pipe fitting can have a branch pipe 122 or branch tubular body and a main pipe 124 or main tubular body. The first valve 108 is attached to the branch pipe 122 (through the third side pipe 116), the second valve 109 is attached to a first end 126 (e.g., the outlet) of the main pipe 124 (through the second side pipe 114), and the injection fitting 106 is attached to a second end 128 (e.g., the inlet) of the tee pipe fitting 118.

As further described in detail below with respect to FIG. 2, the side pipe assembly 104 allows sealant or grease to be injected into the gate valve 102. Additionally, the side pipe assembly 104 allows fluid to be bled out or drained from the gate valve 102. For example, as shown in FIG. 1, to drain the lower body 110 of the gate valve 102, the threaded plug 120 is removed (e.g., unscrewed) from the first valve 108 to open an outlet 123 of the first valve 108 to the ambient environment (e.g., the external environment at atmospheric pressure). Then, the first valve 108 and second valve 109 are opened to form a fluid pathway that extends from the gate valve 102 to the outlet 123. With the first and second valves 108, 109 opened, the fluid "F" in the lower body 110 of the gate valve 102 flows through the side pipe assembly 104 past the second valve 109, the tee pipe fitting 118, and the first valve 108 to exit the side pipe assembly 104 through the outlet 123 of the first valve 108. The pressure at the gate valve 102 is likely higher than the pressure at the outlet, so fluid will flow out the piping assembly through the outlet. In cases where some fluid remains in the lower body (e.g., between the sealing surfaces), a pump or similar device can be attached to the outlet to suck any remaining fluid and completely drain the volume between the sealing surfaces.

Figure 2:
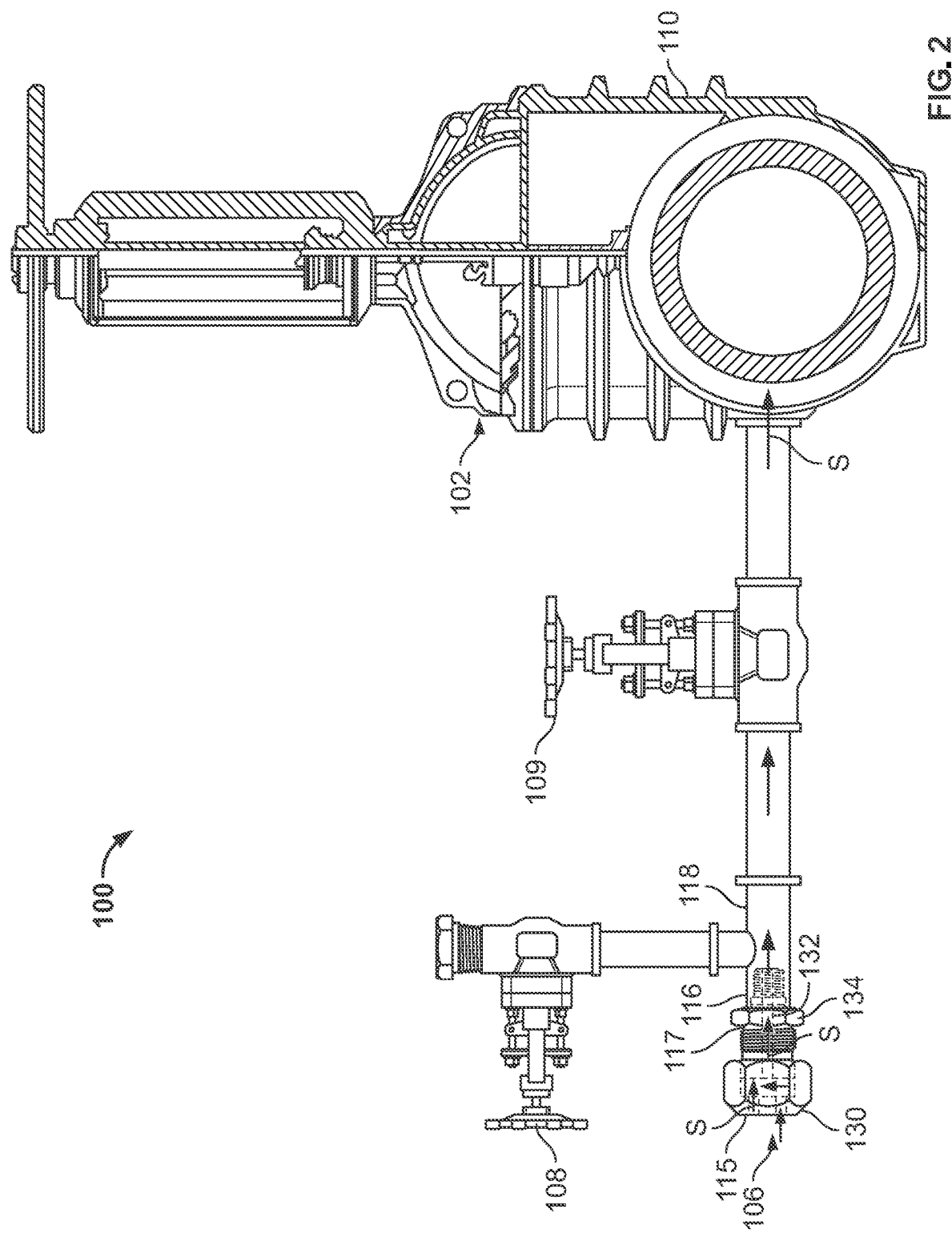
FIG. 2 is a schematic front view of the valve assembly in FIG. 1, during sealant injection.

Referring now to FIG. 2, to inject a sealant into the gate vale 102, the injection fitting 106 and the second valve 109 can be used to open a fluid pathway that extends from the injection fitting 106 to the lower body 110 of the gate valve 102. The injection fitting 106 receives a sealant "S" or grease or a similar substance that is flowed to the lower body 110 of the gate valve 102 when needed (e.g., for emergency jobs). For example, the gate valve 102 may be sealed or partially sealed when the salability of the gate of the gate valve is compromised such as when the sealing surface(s) of the gate 121 (or sealing rings or fittings) of the gate valve is deteriorated. The sealant can be injected to temporarily stop the leakage into the second pipe 304 to allow the gate valve 102 to be in-line repaired or serviced. For example, once the sealant "S" is injected and leakage is controlled, the gate valve 102 can be opened (e.g., from on top) to repair the gate valve 102. The grease can help prevent damage to the sealing surface of the gate 121 of the gate valve 102 by lubricating the sealing surface. In some cases, the sealant "S" allows the gate valve 102 to be removed to perform any major repair for the sealing face or to replace all or parts of the gate valve 102.

The injection fitting 106 is a seat injection fitting or high-pressure grease fitting. In some implementations, the injection fitting 106 can be a different type of injection fitting, such as a packing injection fitting. In some cases, the injection fitting 106 can be used on the used setup of connection, allowing different selection of injection fitting or plugs to be used to enhance or upgrade this connection.

The injection fitting 106 has an injection inlet 115 or port that opens to receive the sealant "S" or grease. For example, the injection fitting 106 can have a threaded sleeve 117 (e.g., a hollow body) with two threads (one of them threaded into the tee pipe fitting 118) and a polygonal surface 134 in between. The polygonal surface 134 allows a tool to impart torque on the sleeve 117 to thread the sleeve 116 into the tee pipe fitting 118. The injection fitting 106 also has a threaded head 130 threaded into the threaded sleeve 117. The threaded sleeve 117 defines a fluid conduit 132 (that can optionally have a one-way valve) that, when the threaded head 130 is slightly unscrewed, is in fluid communication with the inlet 115 of the threaded head 130.

When the injection fitting 106 is not in use, the head 130 is threaded in (as shown in FIG. 1) to close the injection inlet 115. To inject the sealant "S" or grease, the head 130 is threaded out to open the fluid pathway. A pump or similar device can be connected to the head 130 to flow the sealant "S" through the inlet 115 into the tee pipe fitting 118 and to the second valve 109. The second valve 109 can then be opened to allow the sealant "S" to flow to the lower body 110 of the gate valve 102. In some implementations, the sealant "S" can be flowed against a pressure of between 100 to 200 pounds per square inch (psi) more than a pressure at the gate valve 102.

Figure 4:
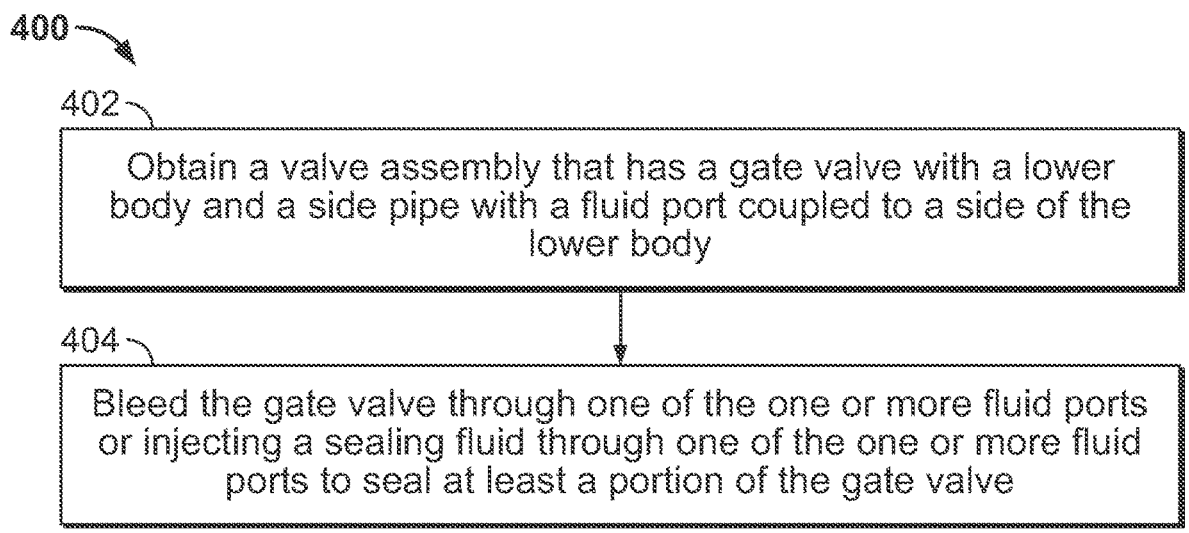
FIG. 4 is a flow chart of a method of bleeding a gate valve or injecting a sealant into the gate valve.

FIG. 4 shows a flow chart of an example method 400 of operating a gate valve. The method includes obtaining a valve assembly that has a gate valve with a lower body comprising and a side pipe with a fluid port coupled to a side of the lower body (405). The method also includes either bleeding the gate valve through one of the one or more fluid ports or injecting a sealing fluid through one of the one or more fluid ports to seal at least a portion of the gate valve (410).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that the mere use of the term "first" and "second" does not require that there be any "third" component, although that possibility is contemplated under the scope of the present disclosure.

What is claimed is:

1. A valve assembly, comprising:
   a gate valve comprising a lower body configured to be disposed between and fluidly coupled to a first pipe and a second pipe, the first pipe upstream of the lower body and the second pipe downstream of the lower body; and
   an injection fitting configured to be coupled to a side of the lower body of the gate valve, the injection fitting configured to receive a sealing fluid to be flowed to the lower body of the gate valve to seal at least a portion of the gate valve.

2. The valve assembly of claim 1, further comprising:
   a first valve configured to be fluidly coupled to the lower body of the gate valve; and
   a second valve configured to be disposed between and fluidly coupled to the first valve and the gate valve, wherein the injection fitting is configured to receive the sealing fluid to be flowed, with the second valve opened, to the gate valve.

3. The valve assembly of claim 2, wherein the second valve is, with the first valve coupled to the gate valve, cold tapped or threaded into the side of the lower body of the gate valve between two sealing surfaces of a gate of the gate valve.

4. The valve assembly of claim 2, further comprising a third pipe disposed between and fluidly coupled to the second valve and the gate valve, the third pipe cold tapped or threaded into the side of the lower body of the gate valve.

5. The valve assembly of claim 4, wherein the third pipe comprises a pipe spool comprising an internal diameter of between 0.5 and 2 inches.

6. The valve assembly of claim 2, wherein the first valve is, with the first valve fluidly coupled to the second valve, attached to a branch pipe of a tee pipe fitting, the second valve coupled to a first end of a main pipe of the tee pipe fitting.

7. The valve assembly of claim 6, wherein the injection fitting is, with the injection fitting coupled to the side of the gate valve, attached to a second end of the main pipe of the tee pipe fitting, the injection fitting configured to receive a sealant or grease to be flowed, with the second valve opened, through the gate valve to seal at least a portion of the gate valve.

8. The valve assembly of claim 7, wherein the injection fitting, the tee pipe fitting, the first valve, and the second valve are configured to allow the sealant or grease to be injected against a pressure of between 100 to 200 pounds per square inch more than a pressure at the gate valve.

9. The valve assembly of claim 2, wherein the gate valve comprises a wedge gate valve, the first valve comprises a first gate valve, and the second valve comprises a second gate valve, the first gate valve and the second gate valve configured to open to allow draining of the lower body of the wedge gate valve such that the valve assembly forms a double block and bleed (DBB) valve.

10. The valve assembly of claim 2, wherein the first valve is fluidly coupled to a threaded plug configured to be removed from the first valve to open the first valve to an ambient environment to allow, with the first valve and the second valve opened, draining of the lower body of the gate valve.

11. The valve assembly of claim 10, wherein the first valve comprises a 0.5 to 4 inch gate valve and the second valve comprises a 0.5 to 4 inch gate valve.

12. The valve assembly of claim 11, wherein the first valve comprises a first API 602 gate valve and the second valve comprises a second API 602 gate valve.

13. A method, comprising:
   obtaining a valve assembly comprising,
      (i) a gate valve comprising a lower body comprising an inlet fluidly coupled to a first pipe and an outlet fluidly coupled to a second pipe, and (ii) a side pipe connected to a side of the lower body, the side pipe comprising one or more fluid ports; and
   either bleeding the gate valve through one of the one or more fluid ports or injecting a sealing fluid through one of the one or more fluid ports to seal at least a portion of the gate valve.

14. The method of claim 13, wherein the one or more fluid ports comprises a first fluid outlet of a valve fluidly coupled to the side of the side of the gate valve and a second fluid outlet of an injection fitting coupled to a side of the gate valve, the injection fitting configured to receive a sealing fluid to be flowed to the lower body of the gate valve to seal at least a portion of the gate valve.

15. The method of claim 14, wherein bleeding the gate valve comprises removing a threaded plug of the valve and opening the valve to open the valve to an ambient environment.

* * * * *

UNITED STATES PATENT AND TRADEMARK OFFICE
CERTIFICATE OF CORRECTION

PATENT NO. : 11,946,567 B1
APPLICATION NO. : 17/986986
DATED : April 2, 2024
INVENTOR(S) : Mohanned Tarabzouni It is certified that error appears in the above-identified patent and that said Letters Patent is hereby corrected as shown below:

In the Claims

In Column 6, Line 63, Claim 14, please replace "side of the side of the" with -- side of the --

Signed and Sealed this
Sixteenth Day of July, 2024

Katherine Kelly Vidal
*Director of the United States Patent and Trademark Office*